UNITED STATES PATENT OFFICE.

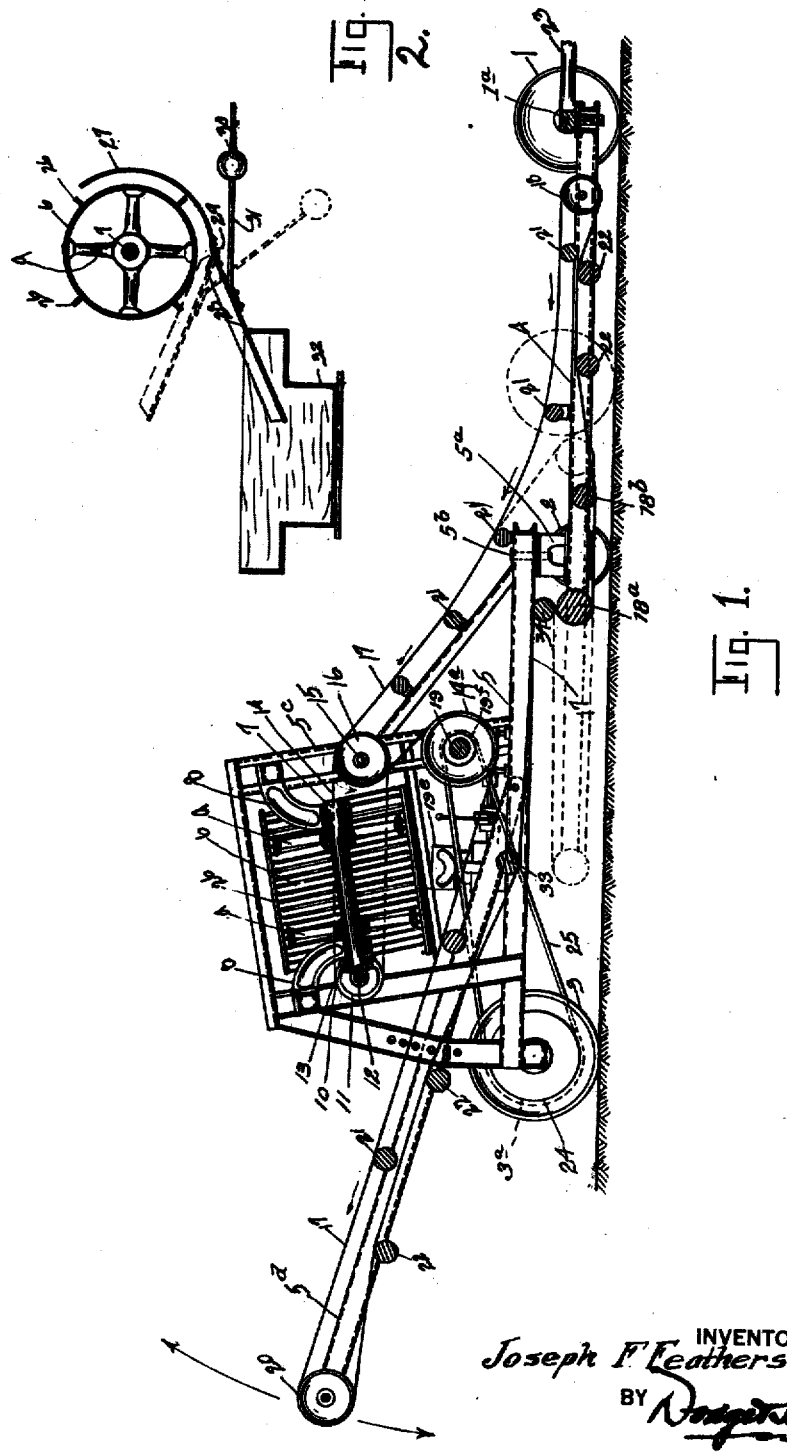

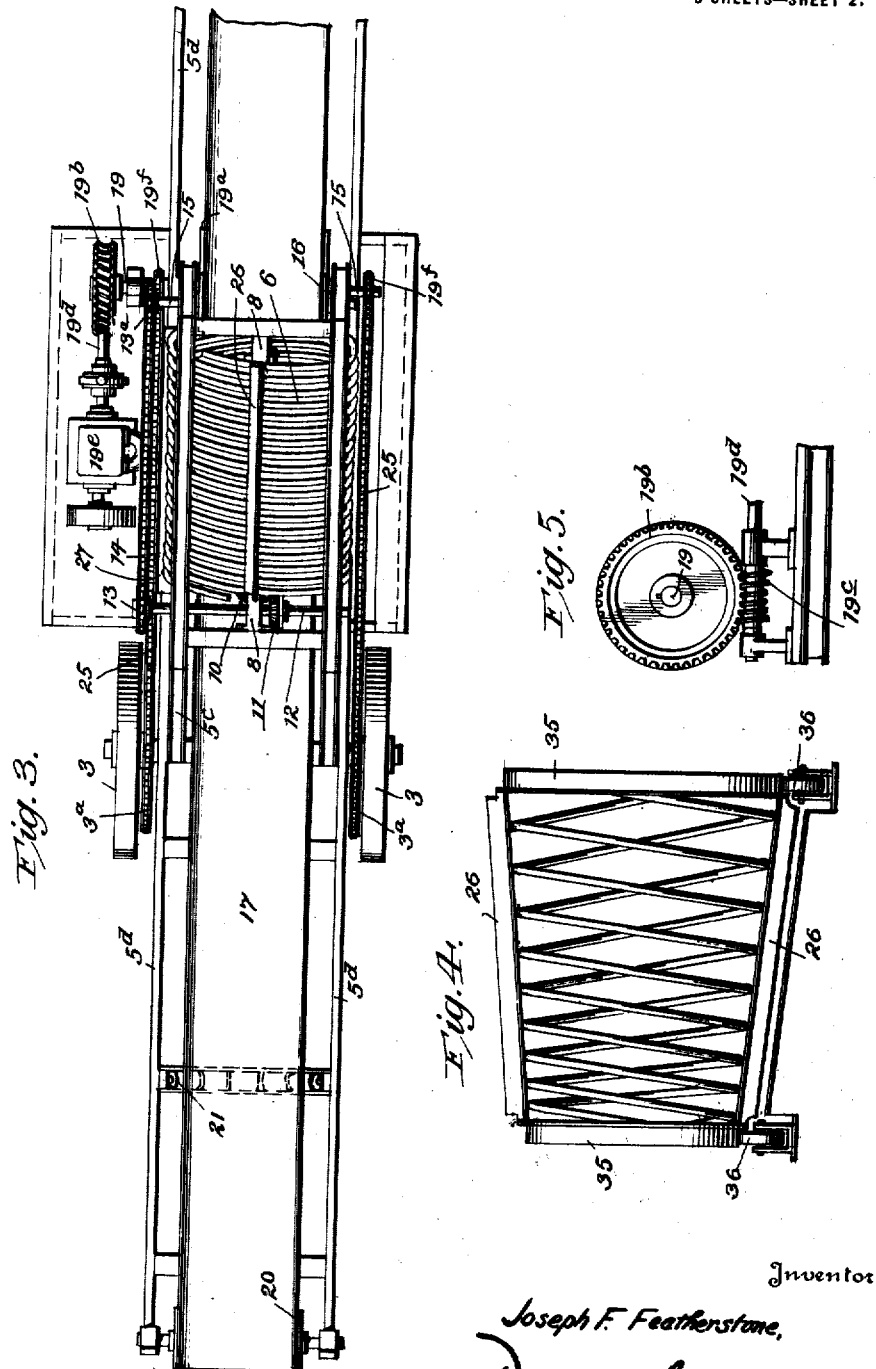

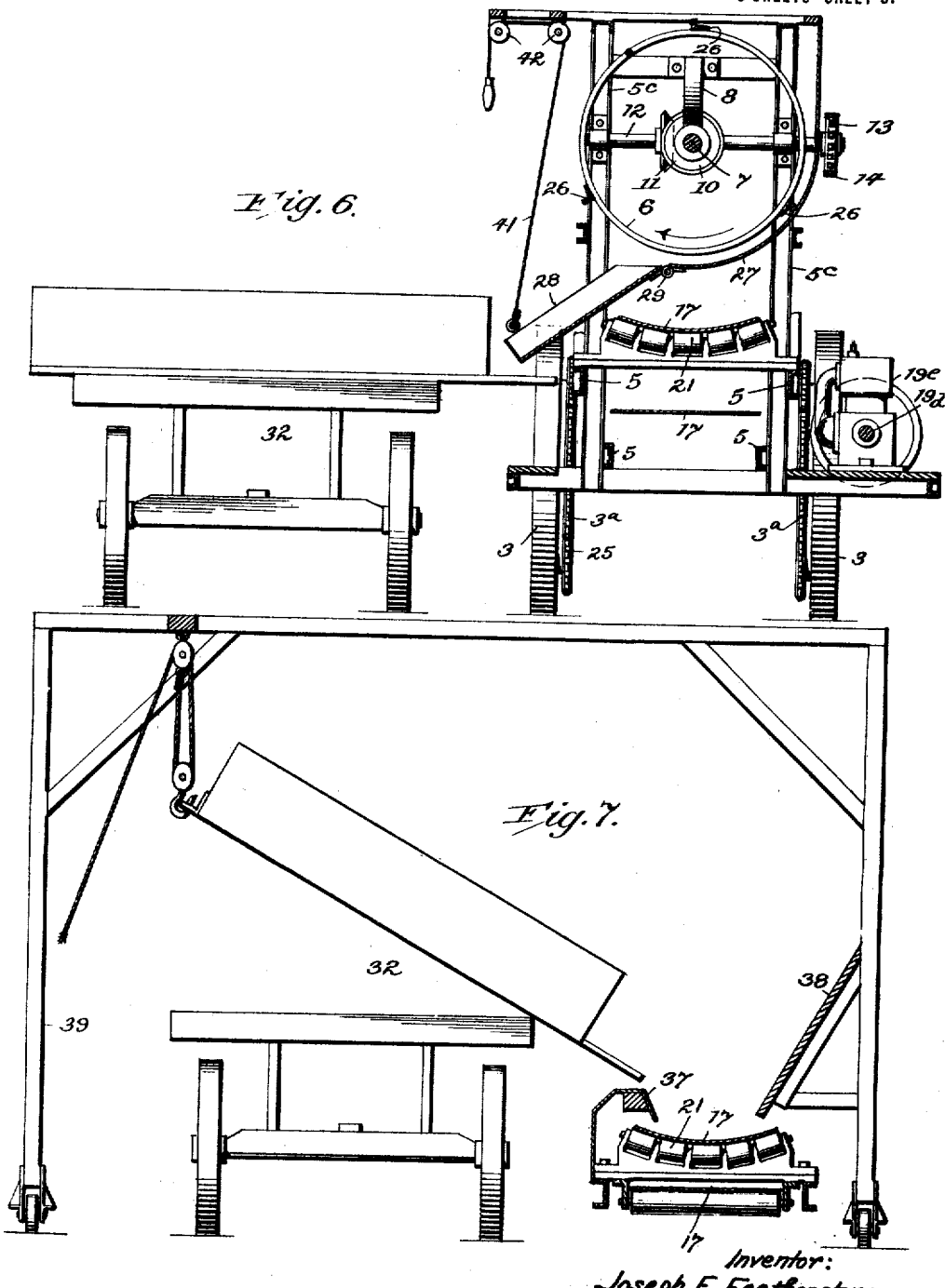

JOSEPH FREDERICK FEATHERSTONE, OF LOGAN, UTAH.

MACHINE FOR CLEANING VEGETABLE AND OTHER PRODUCTS.

1,335,675.  Specification of Letters Patent.  Patented Mar. 30, 1920.

Application filed June 24, 1919. Serial No. 306,346.

*To all whom it may concern:*

Be it known that I, JOSEPH FREDERICK FEATHERSTONE, a citizen of the United States, residing at Logan, in the county of Cache and State of Utah, have invented certain new and useful Improvements in Machines for Cleaning Vegetable and other Products, of which the following is a specification.

My invention pertains to apparatus for handling vegetables and other products, which are commonly received with more or less soil or other extraneous matter adhering to them.

The purpose of the invention is to effect removal of such adhering matter while passing the vegetables or other products from the receiving bed to an elevator or carrier which serves to deliver and pile the same in a mound, or to discharge them into bins, upon the floor of a warehouse, or deposit them in any suitable place.

The apparatus consists of a wheeled main frame comprising two parts capable of being moved one into the other for convenience in movement and housing, but adapted to be extended to properly position the various parts for use; an endless carrier belt led about and over drums or rollers, so as to form at one point a receiving bed for the uncleaned products; at another point an elevator by which said products are delivered to a riddle or screen, by the action of which soil and foreign matters are removed; and at still another point constituting a second elevator or a conveyer by which the cleaned product discharged from the screen or riddle is received and carried to the desired point of delivery, at any convenient elevation, so as to form a relatively high pile or mound of the product, or to discharge it into bins or other receptacles.

Provision is made for utilizing a single actuating motor for propulsion of the wheeled frame from point to point, and for operating the screen or riddle and the carrier belt.

The uncleaned products are delivered to the apparatus by wagons or trucks after being weighed therein, and the soil and foreign matter is discharged into the same wagon or truck which, being again weighed with its contents, shows by the difference in the two weighings, the net weight or weight of the cleaned product delivered, and permits the soil to be restored to the field or carried away and dumped if not wanted.

The preferred embodiment of the invention is illustrated in the accompanying drawings, wherein:

Figure 1 is a longitudinal vertical section of the structure, showing the frame in full lines in its extended condition, and indicating by dotted lines its adjustment for travel or housing;

Fig. 2 is a transverse sectional view of the riddle or screen and its casing, illustrating the manner of discharging the soil or foreign matters removed from the product;

Fig. 3 is a top plan view of a portion of the structure, embracing the main frame and delivery carrier or elevator;

Fig. 4 is an elevation of a riddle or screen mounted and rotatable upon rollers;

Fig. 5, a view illustrating one form of gear connection between the motor and the main or primary driving shaft of the machine proper;

Fig. 6, a transverse sectional view illustrating a modified form of the soil-delivery chute;

Fig. 7, a view illustrating the mode of delivering the uncleaned product to the receiving bed of the machine or apparatus.

The drawings herein are somewhat diagrammatic in nature, it being of course understood that suitable trussing or bracing will be employed as is usual both in structural steel and wooden construction.

In these drawings, 1, 2 and 3 indicate ground wheels upon which is carried a two-part main frame 4 and 5, the part 4 being constructed and arranged to move relatively to or to run under the part 5, so as to shorten the frame for convenience in transportation and housing. In the drawings the main frame 4 and 5 and the framework erected upon the latter, are represented as built up of structural steel, channel bars being indicated, and it being understood that these are united by bolts or rivets in the usual way and braced or trussed where necessary in the ordinary manner of structural steel construction.

At the forward end of frame-section 4 there is provided a horizontal axle 1ᵃ having at its ends the usual spindles for the ground wheels 1, the axle being arranged to swivel about a king-bolt at its midlength, as indicated. The construction of the swivel is unimportant, any usual arrangement of king-bolt and turn-table or fifth wheel suitable to the weight and dimensions of the structure being available. To the axle 1ª is rigidly attached a tongue 23, which may be provided with whiffletrees to permit the structure to be drawn by draft animals when desired. The tongue also serves to swing the axle about its pivot or king-bolt, to position the machine and particularly the end of the discharge elevator.

At the forward end of the frame-section 5 I arrange one or two carrying wheels 2. These may be in the form of caster wheels or, and as is preferred, may be carried by stub-axles of a transverse arch-like frame 5ª, which in the latter case will be arranged to swivel about a king-bolt 5ᵇ. Under this construction the entire structure may be swung about a point midway between the rear ground wheels 3 so as carry the delivery end of the discharge elevator to the right or the left to vary the discharge point. The frame-section 4 is arranged so that it may freely slide through the transverse arch or frame member 5ª, from the full line position shown in Fig. 1 to the dotted line position there shown, thus reducing the total length of the structure to bring it within convenient dimensions for transportation or storage.

Mounted upon and rising from frame-section 5 is an upright frame 5ᶜ within which is arranged a rotary screen or riddle 6, represented in Fig. 1 as carried upon a central shaft or axle 7 journaled in bracket hangers 8 made fast to the upright frame 5ᶜ. The cylindrical screen body is provided with spiders 9, keyed or otherwise secured to the shaft 7, and is further provided with external, radially arranged, longitudinal strips or bars 26, which serve to strengthen the screen or riddle and also act as scrapers, as presently pointed out. Rotary motion is imparted to the screen or riddle 6 through bevel gears or pinions 10 and 11, respectively carried by the screen-shaft 7 and by a horizontal shaft 12 journaled in bearings on the frame 5ᶜ. Rotary motion is imparted to shaft 12 by a pulley or sprocket-wheel 13 keyed thereon, and driven by a belt 14 of any suitable construction, a link belt being preferred. The belt 14 passes about the sprocket-wheel 13 and about a like sprocket-wheel 13ª carried by a horizontal shaft 15 rotating in bearings carried by frame 5ᶜ, said shaft carrying also a drum or roller 16.

Below the shaft 15 is another and parallel shaft 19, which carries a drum or roller 19ª (Fig. 1), and a worm-wheel 19ᵇ (Figs. 3 and 5). A worm 19ᶜ (Fig. 5) carried by the shaft 19ᵈ of a motor 19ᵉ gives rotation to the worm-wheel 19ᵇ and through it to the shaft 19. This shaft 19 is provided at each side of the upright frame 5ᶜ with a sprocket-wheel 19ᶠ, in plane or alinement with a sprocket-wheel 3ª secured to the wheel 3 on the same side of frame 5ᶜ. Sprocket drive chains 25 passing about the sprocket-wheels 19ᶠ and 3ª, serve to impart motion to the traction wheels 3, and thus to propel the entire wheeled structure from place to place.

Pivotally attached to and supported by frame-section 5 is an elevator-frame 5ᵈ, carrying at its outer extremity a drum or roll 20, and at intermediate points rollers 21 on its upper side. These rollers are what are commonly known in the art as troughing rolls; that is to say, they are so formed or arranged as to give to a flexible carrier band or belt lying upon their upper faces, a curved or trough-like form in transverse section. This effect is preferably produced by employing a plurality of rolls with their axes at progressively increasing angles to the horizon, so as to produce by the series of rolls the curved supporting surfaces. This is illustrated in Figs. 6 and 7. The equally common expedient of a single roll of a length equal to that of the series of rolls, and reduced in diameter progressively from each end toward its midlength, may be adopted. Similar rolls 21 are arranged across suitable brace members extending in an inclined position from frame-section 5 to points at about the midheight of upright frame 5ᶜ, at the forward end of frame-section 5, and at points on frame-section 4.

A roll or drum 18 extends across the forward part of frame-section 4, and a similar roll or drum 18ª across the rear part of said frame-section, as shown in Fig. 1. Other rolls 33 and 34, located respectively near the mid-length of frame-section 5 and at the forward and under side of said frame, serve with those already mentioned to support and give direction to an endless carrier belt 17, while additional rolls 22 are located at convenient points beneath the lower stretch of said belt 17, and made adjustable in any usual or convenient way to serve as tensioning rolls for said belt.

Taking drum 19ª carried by shaft 19 as the belt-driving drum, since shaft 19 is directly driven by the prime motor 19ᵉ, the carrier belt 17 passes from the lower side of drum 19ª over and about roll 20, beneath roll 33 to the top of and about roll 34, to the upper side of roll 18ª and beneath said roll and roll 18ᵇ to the under side of roll 18, about said roll to the upper side of roll 16, about said roll and back to roll 19ª, as will be seen upon referring to Fig. 1. In passing from one to another of these main directing rolls, the upper stretch of the belt passes over the troughing rolls 21, and the lower or return stretch passes over the tensioning rolls 22, but under rolls 33, 18ª and 18ᵇ. More or fewer guiding and directing rolls may be employed, but the rolls 19ª, 20, 33, 34, 18ª, 18ᵇ, 18 and 16 will ordinarily be employed, as they are necessary to insure proper guidance of the belt in operation, and to permit the telescoping of the two frame-sections 4 and 5.

In running the frame-section 4 into or beneath the section 5, the roll 18ª presses against the belt, and draws upon the under stretch thereof from roll 18 toward roll 18ª, thereby taking up between roll 34 and roll 18ª the slack which would otherwise be occasioned by the movement of roll 18 toward roll 34. In this way the use of a continuous single carrier belt is made possible without in any manner interfering with the free telescoping of the frame, since the rolls 18 and 18ª respectively take up the slack incident to movement of frame-section 4 relatively to frame-section 5, in both directions.

Roll 16, which advisably will be of less diameter at its midlength than at its extremities, is located at a point higher than the lower side of the screen or riddle 6, the axis of which latter is preferably inclined as shown in Fig. 1, so that the roller 15 shall overhang the lower side of the receiving end of said screen or riddle. It will be noted also that the upper stretch of the belt proceeding from the lower side of roll or drum 19ª to the upper side of roll 20, passes near the lower side of the delivery end of the screen or riddle 6, and hence receives the cleaned product delivered from said screen.

From the path given to carrier belt 17 as above outlined it will be seen that there is a backwardly and upwardly moving stretch extending from roll 18 to roll 16, and a second backwardly and upwardly moving stretch extending from roll 19ª to roll 20, that portion of the carrier nearest roll 18 being in nearly horizontal position, while the portion nearer roll 16 is at a comparatively steep angle to the forward or lower portion of this stretch. The lower or substantially horizontal portion of this stretch of the belt forms a receiving bed upon which is deposited, usually a wagon-load at a time, the product to be handled. The placing of such product upon the belt is conveniently effected in the manner represented in Fig. 7, where is shown a vehicle 32 the body of which is adapted to be raised or tipped laterally so as to discharge from its hinged and outwardly falling side, its contents, which are by said lowered side and the bottom of the wagon body directed to the receiving bed. Guards 37 and 38 at opposite sides of the receiving bed serve to prevent the deposited load from passing over the sides or edges of the carrier 17.

To facilitate the lifting or tilting of the wagon body, and to afford a support for the guards 37 and 38, a gantry 39 mounted on suitable wheels or rollers and adapted to straddle the wagon and the receiving bed, is or may be employed, a block and tackle being suspended from the upper portion of said gantry, and provided with a hook to engage an eye on the wagon body, as will readily be understood upon referring to Fig. 7.

Between the under side of the screen or riddle 6 and the carrier belt 17 there extends from end to end of the screen an imperforate guard or hopper, comprising a fixed member 27 concentric with the screen or riddle, and a second section 28 pivotally connected to the lower edge of the section 27 by hinges 29. The section 28 is in the form of a flat plane but with an upstanding flange at one or both ends, to prevent escape of material falling thereon except at its outer or free edge.

Under the arrangement shown in Fig. 2, the section 28 of the guard or hopper is provided with a counterweight 30 carried by an arm 31, and serving normally to hold said section 28 in the elevated position indicated by dotted lines in said figure. While held in this position the section 28 jointly with section 27 constitutes a hopper or container into which falls all the foreign matter passing through the openings of the screen or riddle 6, and the longitudinal blades or scrapers 26 on the exterior of the screen serve to move said matter past the meeting line of the two sections and toward the delivery edge of the plane section 28, where through accumulation and increasing weight it serves to overcome the counterweight 30 and gives a downward inclination of the section 28. This accumulation occurs only after the machine has been in operation for a period of time sufficient to permit the wagon which has brought a load of vegetables or other products to and delivered them upon the carrier belt 17, to move to a point beneath the then elevated section 28 of the hopper or receiver 27—28, so that it may receive the matter discharged from said hopper. The inclination of the member 28 of the hopper should be sufficient to insure the discharge of all matter falling upon it.

The screened or cleaned product discharged from the rear end of the screen or riddle falls upon the second or rearward upper stretch of the belt 17 extending from the under side of roll 19ª to the upper side of roll 20, and is thereby carried to and discharged over said roll 20. The supporting frame 5ᵈ in which the roller 20 is mounted being pivotally connected with section 5 of the main frame, may be raised or lowered as desired, and held at any desired elevation by any suitable supporting or locking means, as for instance, heavy pins passed through any one of a series of holes formed in opposite uprights of frame 5ᶜ, the pins being arranged to project beneath the side bars of frame 5ᵈ. Any other equivalent means may of course be employed for this purpose.

As an alternative means of raising and lowering the hinged section 28 of the screen or riddle guard, I may employ a flexible band, as a rope or chain 41, attached to the free side of said member 28, and passing over the pulley or pulleys 42, the depending free end of said rope or chain being placed within convenient reach of the driver of the vehicle 32 so that it may be released to lower said section 28, or drawn down to elevate the same, and made fast to hold it in elevated position.

Clutches will be introduced at suitable points to permit the screen or riddle and the carrier belt to be driven without imparting motion to the ground wheels 3, and to permit the ground wheels to be turned without imparting motion to the screen or riddle and belt. One such clutch is shown in Fig. 3, between the motor shaft and the worm, to permit the motor to be entirely disconnected when desired.

As represented in Figs. 3 and 4 and as preferred in practice, the screen drum or cylinder of the riddle is formed of one or more heavy wires or light rods of iron or like metal, spirally coiled, the respective coils being spaced either equidistant from each other, or at progressively varying distances apart as preferred, and being held in their proper relative positions by annular heads 35 and longitudinal exterior bars 26 constituting the scrapers which as heretofore explained discharge the waste material, which falling through the screen or riddle cylinder is deposited in the hopper 27—28. When provided with the annular heads 35 said heads are preferably made of iron of L-form in cross section, so that one flange or web of the iron shall lie in a plane perpendicular to the axis of the screen or riddle, and the other be parallel to and concentric with said axis. This latter portion rests and travels upon rollers 36 journaled in suitable supports in frame 5ᶜ, motion being imparted to the riddle or to the supporting rollers 36 through belt or gear connection with any convenient driven shaft of the machine, or with the motor shaft.

This spiral winding of the screen or riddle and its support by external rollers possesses the special advantage in the present structure that it leaves wholly unimpeded the interior of the screen or riddle, and by reason of the spiral arrangement of the winding, causes the product lying on the lower inside surface of the screen to be positively advanced from the receiving toward the discharging end. This rate of advance can be predetermined by the pitch of the spiral, a single or continuous rod or wire being employed where a very slow pitch is desired, and two or more wires or rods being employed where a quicker pitch is advisable. The direction of the spiral must of course be such that when turning in a direction to discharge material from the hopper 27—28, the effect of the spiral shall be to advance the contents of the riddle toward the discharge end.

The employment of a single continuous carrier, constituting at once the receiving bed, the elevator for delivering the uncleaned product to the screen or riddle, and the discharge carrier or elevator, greatly simplifies the structure, insures like speed of travel at all points, reduces expense and repairs, and is an important feature of the invention.

I am aware that elevators and conveyers have been constructed with telescopic frames or supports, enabling the delivery end to be projected to varying distances from its support or base, and that the conveyer chain or belt of such a structure has been carried about pulleys or rollers so arranged as to maintain a constant tension thereon under varying extensions of the frame and when the extensible frame is fully contracted.

I am also aware that a continuous conveyer or carrier belt has been arranged to pass a series of stations, spouts, or hoppers and to deliver material to or from each in succession.

So far as I am advised, however, no one has heretofore arranged such a carrier belt or chain in a machine for cleaning vegetables or other bodies in a manner permitting the two-part supporting frame thereof and the rolls about which such belt or chain is carried therein, to be moved relatively to lengthen and shorten the structure for use or for transportation or storage without disturbing the tension of the carrier belt or chain. Nor has any one, to my knowledge, hitherto arranged the carrier belt or chain in a way enabling it to serve at different points in the machine, as a receiving bed for the unclean product, as an elevator for delivering the same into a cleaning riddle or screen, and as a conveyer or elevator for delivering the cleaned product from the machine to a vehicle or into a storage-room or bin at a distance from and at varying heights relatively to the cleaning riddle or screen.

These features add greatly to the utility of the structure, while tending to simplicity and lessening cost of construction.

Having thus described my invention what I claim is:—

1. A machine for cleaning products, comprising a main supporting frame; a screen or riddle mounted thereon; and a continuous carrier belt serving to receive the products to be cleaned, to elevate the same and deliver them to the cleaning mechanism, and to receive the cleaned product and convey it to the point of delivery or discharge.

2. A machine for cleaning vegetable and other products, comprising a two-part extensible and contractible main frame; a screen or riddle carried thereby; and a continuous carrier belt for receiving the uncleaned product, delivering the same to the screen or riddle, and receiving the cleaned product from the same and discharging it at a distance therefrom.

3. A machine for cleaning vegetables and other products, comprising a main frame; a screen or riddle mounted upon said frame; a continuous carrier belt serving to receive, elevate, and discharge the products; supporting and guiding rollers for said belt; and means for imparting motion to the screen or riddle and to the belt.

4. A machine for cleaning vegetables and other products, comprising a main frame; a screen or riddle mounted thereon; a hopper beneath said screen or riddle, provided with a normally closed outlet; means for opening said outlet; a continuous carrier belt serving to receive, elevate, and discharge the products; supporting and directing rollers for said carrier; and means for imparting motion to the screen or riddle and to the carrier belt.

5. A machine for cleaning vegetables and other products, comprising a main frame; a rotary screen or riddle mounted thereon and having its screening surface formed of a spirally wound rod or rods, means for rotating said screen or riddle; a collecting hopper to receive the matters separated from the product treated; and means for receiving the uncleaned product, delivering the same to the screen or riddle, receiving the cleaned product therefrom, and discharging it from the machine.

6. A machine for cleaning vegetable and other products, comprising a wheeled frame; a riddle or screen carried by said frame; a vertically adjustable frame mounted in the main frame; rollers carried by the respective frames; and an endless carrier belt carried by said rollers, and having its delivery at the free end of the vertically adjustable frame, whereby the cleaned product may be delivered at varying elevations.

7. A machine for cleaning vegetable and other products, comprising a two-part wheeled frame capable of extension and contraction; a screen or riddle carried by said frame; rollers carried by the framework of the machine; an endless carrier belt supported and guided by said rollers; a motor for imparting motion to the screen or riddle, the carrier, and the ground wheels; and suitable connections between the motor and said parts.

8. An apparatus for cleaning vegetables and other products, comprising a main frame having a vertically adjustable rear section; a rotary screen or riddle mounted in said frame at a point between the receiving and delivery ends; means for rotating the screen or riddle; rollers mounted in the main frame and in the vertically adjustable section; an endless carrier belt led about said rollers and forming a receiving bed and an elevator extending therefrom to the receiving end of the screen or riddle, and also forming a conveyer extending rearwardly from the riddle; and means for moving said carrier belt, whereby the product is received, elevated, delivered to the screen or riddle, conveyed therefrom, and delivered at the desired level or elevation by the single belt.

9. An apparatus for cleaning products, comprising a two-part frame capable of extension and contraction; a screen or riddle for removing dirt and undersized matters; an endless carrier belt serving to deliver uncleaned products to and cleaned products from the screen or riddle; and rollers carried by the respective sections of the frame and serving to support and guide the carrier belt when the same is in action, and to take up slack and maintain proper tension of said belt when the frame sections are adjusted one in relation to the other.

10. In a machine for cleaning vegetables and other products, a rotary screen or riddle having a substantially cylindrical body formed of spirally wound rods or wires, and provided with external longitudinal scrapers; and a hopper to receive the screenings from said screen or riddle, conforming approximately to the contour of the screen or riddle, to be swept by the scrapers thereof.

In testimony whereof I have signed my name to this specification.

JOSEPH FREDERICK FEATHERSTONE.